United States Patent [19]

LaHaye

[11] Patent Number: 4,626,623

[45] Date of Patent: Dec. 2, 1986

[54] METHOD AND APPARATUS FOR TELEPHONE ACCESS SECURITY

[76] Inventor: Joseph G. LaHaye, 614 Colby Drive, Waterloo, Ontario, Canada

[21] Appl. No.: 648,067

[22] Filed: Sep. 7, 1984

[51] Int. Cl.⁴ ............................................ H04M 11/00
[52] U.S. Cl. ..................................... 379/95; 178/22.08
[58] Field of Search ............... 179/1.5 E, 1.5 R, 2 A, 179/2 C, 2 CA, 2 DP, 6.09; 178/22.01, 22.08, 22.09

[56] References Cited

U.S. PATENT DOCUMENTS

| | | | |
|---|---|---|---|
| 3,984,637 | 10/1976 | Caudill et al. | 179/2 DP |
| 4,114,139 | 9/1978 | Boyd et al. | 179/2 DP X |
| 4,430,728 | 2/1984 | Beitel et al. | 179/2 DP X |
| 4,520,233 | 5/1985 | Smith | 178/22.08 X |
| 4,546,213 | 10/1985 | Dick | 179/2 DP X |

OTHER PUBLICATIONS

*Computer Buyer's Guide and Handbook*, Sep. 1984, p. 106, "In Depth: Teltone's Teleport 300 Touch-Tone".

Primary Examiner—Keith E. George
Attorney, Agent, or Firm—George A. Rolston

[57] ABSTRACT

The invention comprises a method and apparatus for providing secure access to a restricted access device, associated with a telephone answering unit at a first location from a second location across a telephone system. The method comprises the steps of at the first location, automatically responding to a telephone call to the first location from the second location to automatically generate and deliver a request signal requiring a coded response to the second location across the telephone system, at the second location, automatically responding to the request signal to automatically generate and deliver a coded transmit signal to the first location across the telephone system, and, at the first location, automatically responding to the coded transmit signal to automatically establish communication connection between the first and second locations across the telephone system. The apparatus comprises a receiving unit operable in response to a telephone call from a telephoning unit to automatically generate a request signal requiring a coded response from the telephoning unit, a transmitting unit being responsive to the request signal and operable to automatically generate and deliver a coded transmit signal, and, a switch circuit means in the receiving unit responsive to the coded transmit signal to automatically establish communication connection between the telephoning unit and the answering unit.

23 Claims, 3 Drawing Figures

METHOD AND APPARATUS FOR TELEPHONE ACCESS SECURITY

NATURE OF THE INVENTION

The invention relates to a method and apparatus for providing telephone access security, and in particular, to a method and apparatus for providing secure access from one telephone station to another across public telephone lines, for example, for communication from one computer to another.

BACKGROUND OF THE INVENTION

In recent years, with the number of computers in use increasing at rapid rates, the risk that data and software stored in computers may be accessed by unauthorized persons has also been increasing. Furthermore, the increased use of such computers makes the presence of such data and software in the computers a more tempting target for would-be thieves. In many applications, systems of computers have been established for interconnected communications. In such instances, one computer located at a first location is able to communicate with another computer at a second location, in order to use either data or software stored in the second computer. Large networks of computers have been established whereby one computer can communicate with any other computer. As well, communication links between only two stations are common.

Communication generally speaking is most useful if it is two-way communication between two such computer stations. In many instances, such two-way communication is established via a public telephone linkup between the stations. Once the telephone linkup is established, the two computers can communicate with each other relatively freely.

In order to connect a computer to a telephone line a device, known generally as a modem, is used. The modem translates the digital signals from a computer into analog signals which can be transmitted over the telephone lines. Similarly, when a modem receives an analog signal from a telephone line it will translate such signal into a digital signal suitable for use by its computer. The modem acts as an interfacing link between the computer and the telephone line. In effect, the computer can talk through a modem much in the same way that a human can talk through the microphone of a telephone.

In operation, two computers are connected to each other via a telephone line through their respective modems. The dialing unit on a first modem at the first location dials a telephone number of the second location. The modem at the second location will "answer" the telephone and connect the first computer to the second. Once the connection is established, the first computer can communicate with the second and vice versa.

In such systems it has been a severe problem that any person at any other telephone location could telephone either of the two computers. In particular, an unauthorized person at a third location with his own computer and modem could simply telephone the other computers and thereby gain access to the computer files contained therein. The unauthorized user could then either simply copy information contained in such files for his own benefit, alter such files in a way that might not be detectable to the owner or authorized user, destroy the files, or otherwise tamper with the information stored in the other computer for his own purposes. Such activities by an unauthorized user may damage the competitive edge of one person in the marketplace or may in fact impair the actual ability of a person to perform work in the marketplace. As well, unauthorized use of confidential information, perhaps related to private individuals, is a dangerous possibility.

It would therefore be highly advantageous to provide a device to restrict access to a computer over the telephone lines to authorized users only. While some computers are provided with internal hardware/software controls in order to restrict access to the computer (for example, by passwords), in the past such hardware/software controls have been an expensive addition to the actual computer itself. It would therefore be advantageous if the computer access device were a separate device which could simply be connected to the computer, or its modem when required.

Furthermore, conventional password access systems transmit passwords from one computer to another by standard and well known analog signals and codes. For example, transmission across telephone lines may use a sinusoidal signal at a pre-determined standard frequency. Such signal may be modulated in accordance with a standard code, such as the ASCII code, for example to encode letters or other information. Thus, any unauthorized user with knowledge of such standard signals and codes is free to attempt to communicate with another computer. Although one unauthorized access attempt may not itself be successful, there is a risk that the correct password may be delivered on a subsequent attempt. For example, the unauthorized user may transmit a string of ASCII characters to the computer simply by trial and error. This can be accomplished by either physically inputting the codes via a terminal or by running a computer program to perform such function automatically. Such a program, if left running constantly, may very well gain access to a restricted computer by ultimately delivering a string of ASCII code which corresponds to a correct password.

Therefore, it would be advantageous to provide an access security device which uses a non-standard signals and codes. Before an unauthorized user could attempt to gain access, he would have to know both the particular signal and code in use. Without such knowledge, the unauthorized user could not even communicate with the restricted-access computer with respect to the correct passwords necessary for entry.

It would be even more advantageous if the nonstandard code used in the access security device could be changed from time to time or even during a single transmission. While decoding would theoretically remain possible, such changes would render decoding virtually impossible because of the amount of time necessary to do the decoding.

Of course, authorized users need access to their own computers. In conventional systems, authorized users have personal knowledge of the necessary passwords. Such personal knowledge is necessary so that the user may log on to the computer by typing in the appropriate password. However, the need for personal knowledge of the passwords introduces security problems. An authorized user may note his password in writing. An unauthorized user may read the written note, may watch the authorized user log on, or may induce the authorized user to tell him the password. Once the unauthorized user has learned the password, he is free to obtain access to the restricted computer from any telephone location.

Accordingly, it would therefore be advantageous if the access security device could automatically establish communication with another computer. The elimination of a human-inputted password eliminates some of the security problems found in conventional systems. The authorized user would have no need to know the passwords. There would therefore be no risk that knowledge of the passwords may be leaked to unauthorized personnel. Furthermore, for physical security it would be advantageous if the access security device could be permanently installed at a particular location.

In addition to the above advantages, other advantages and benefits could be achieved. For example, it would be advantageous if the device were able to record all attempts at establishing communication with the computer. Both authorized and unauthorized attempts could be recorded. As a further advantage, it would be possible for all unauthorized attempts to be immediately reported to a security agency, which could act to trace the unauthorized telephone call and to institute appropriate criminal proceedings.

It will be appreciated that, while the access security device has been discussed in relation to a computer application, such an access security device could be used in any instance where it is desired to limit access by telephone to authorized users only. For example, telephone answering machines contain information which may be confidential. Conventional answering machines can be played back over the telephone to any person delivering a correct code signal to the machine. Similarly, it might be desirable to be able to control a building security system by telephone. For example, in the event of an emergency, it might be desirable to telephone the building and deliver a coded signal to turn the system off. Access to such security system by definition must be restricted. Accordingly, in such situations it would be desirable to interpose an access security device between the telephone answering mechanism and the telephone line itself.

BRIEF SUMMARY OF THE INVENTION

With a view to providing the foregoing advantages and to overcoming the foregoing disadvantages, the invention comprises an access security apparatus for use in association with a telephone system, having a telephoning unit and an answering unit, the answering unit being operable to answer a telephone call from the telephoning unit, the access security apparatus comprising a receiving unit connectable with the answering unit and with the telephone system, the receiving unit being operable in response to a telephone call from the telephoning unit to automatically generate a request signal requiring a coded response from said telephoning unit, a transmitting unit connectable with the telephoning unit and the telephone system, the transmitting unit being responsive to the request signal and operable to automatically deliver a coded transmit signal to the receiving unit, and the receiving unit being responsive to the coded transmit signal to automatically connect the telephoning unit and the answering unit across the telephone system.

The invention achieves the foregoing advantages in the following manner. Two computer access security devices are provided—one at a first computer and another at a second computer. The telephone line connects directly to each of the devices. Each device in turn connects to the modem with its respective computer. One device is in a transmit mode and the other device is in a receive mode. The transmitting access device will transmit a coded signal to the receiving device. The receiving device examines the coded signal to determine whether it matches one of a number of predetermined code words stored in its memory. If a match is established the receiving device will allow a connection to its modem. If a match is not established, the transmitting device attempts several times to deliver a correct password signal. Ultimately, that is within a matter of seconds, if successful matching is not established, the receiving device simply terminates the communication. To the user located at the transmitting device, it appears that although the telephone has been answered, no further communication has taken place.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DETAILED DESCRIPTION OF A SPECIFIC EMBODIMENT

Figure 1:
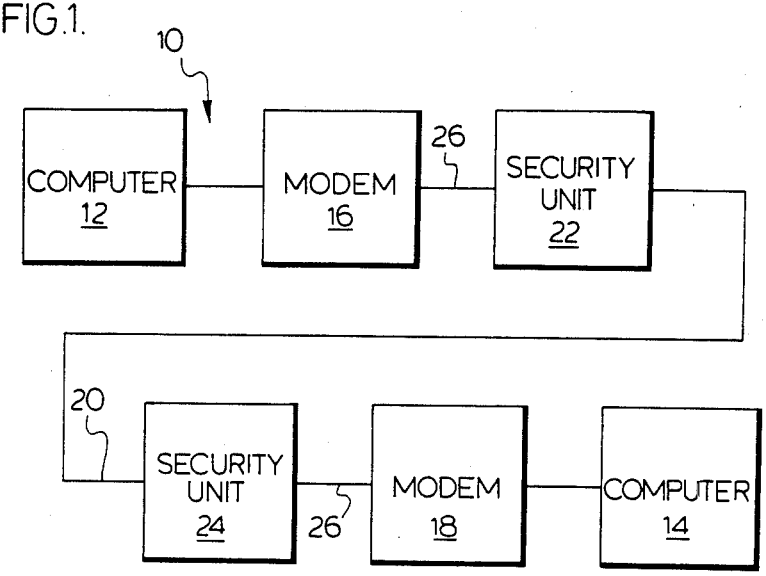
FIG. 1 is a schematic drawing of an apparatus according to the invention as it may be used in a communications link between two stations.

Referring to FIG. 1, there is schematically illustrated a communications link, indicated generally 10, between two computers 12 and 14. At any one given time, one of the computers, say computer 12, is sending data and the other computer, say computer 14, is receiving the data. Each computer 12 and 14 is connected to a modem device 16 and 18, respectively. Modems 16 and 18 are conventional devices which may be either an integral internal part of computer 12 and 14, respectively, or as shown in FIG. 1, they may be separate devices linked to the computers 12 and 14. In existing conventional systems, modems 16 and 18 are directly connected to a communication channel, such as a telephone line 20. However, according to the invention, access security devices 22 and 24 are interposed between modem 16 and modem 18, respectively, and telephone line 20. Security access devices 22 and 24 connect to modem 16 or 18, respectively, by modem line 26.

It will of course be appreciated that although a communications link between computers has been illustrated, access security devices according to the invention, may be equally applied to any communications link in which it is desired to limit access to any device to authorized personnel only. It is not intended to restrict the scope of the invention to a communications link between computers. Rather, it is the intention that the scope of the invention cover any application in which it is desired to restrict access to any device by a telephone link up.

Figure 2:
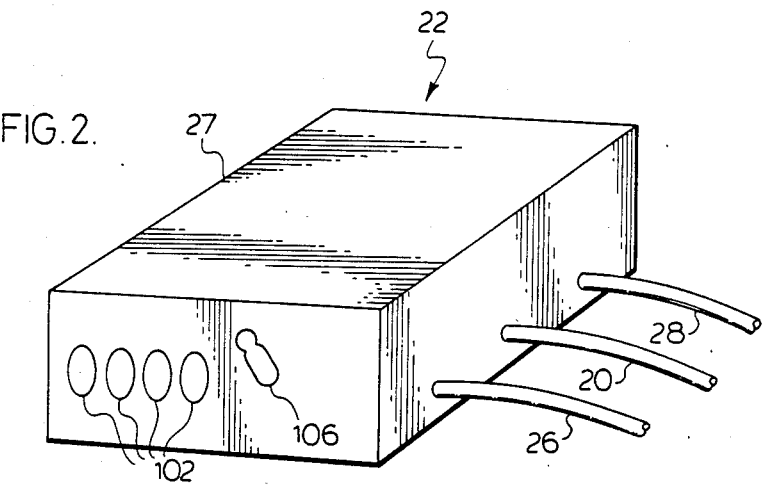
FIG. 2 is a close up perspective view of a single access security device according to the invention.

Referring to FIG. 2, there is illustrated an access security device 22, according to the invention. A device 22 comprises a housing 27, within which the circuitry (not shown) is secured. Telephone line 20 is connected to such circuitry through housing 27. Similarly, modem line 26 connects the circuitry to a modem 16. Finally, a power line 28 connects the circuitry to a suitable source of power in a manner well known in the electronic arts. In some applications, the access security device 22 may be provided with batteries, in which case a separate power line 28 may not be necessary. A front panel of housing 27 supports indicator lights 102 and a mode select switch means 106, the functions of which are described below.

Figure 3:
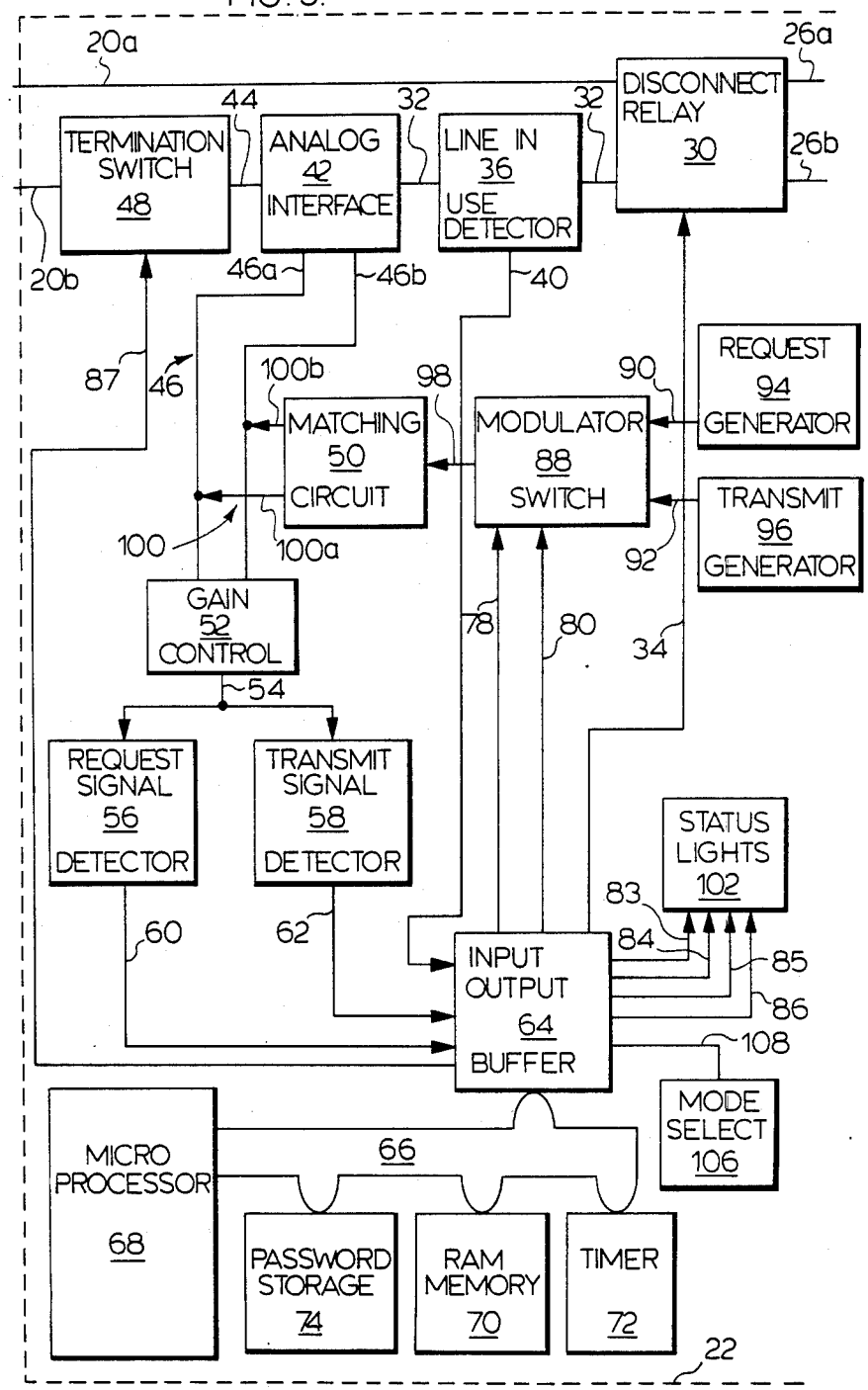
FIG. 3 is a block diagram of a device according to the invention.

Referring to FIG. 3, there is illustrated a block diagram of one access security device 22, according to the invention. It will be appreciated that security devices 22 and 24 may be physically identical. However, each security device 22 or 24 can be operated in a transmitting or in a receiving mode. As discussed below, a change in the mode may be accomplished by a mode select switch means 106. In FIG. 1, security device 22 is in a transmitting mode and security device 24 is in a receiving mode. It will be appreciated that for the purposes of the description of a single access security device according to the invention, reference to security device 22 is identical to and incorporates a reference to security device 24. In the description of the method of operation, the distinction between transmitting security device 22 and receiving security device 24 is important and the distinction therebetween is rigidly maintained.

It will be appreciated, of course, that the access security devices according to the invention could be simplified for one-way security. In such an embodiment, the two units would be different from each other. In particular, one unit would contain all circuitry necessary to accept an incoming call. The other unit would contain all circuitry necessary to make an outgoing call. In effect, the former unit would act identically to access security device 24 permanently fixed in a receive mode. Similarly, the latter unit would act identically to access security device 22 permanently fixed in a transmit mode. Each of access security devices 22 and 24 include all of the said circuitry necessary for both incoming and outgoing calls, together with a mode selection switch means 106.

With respect to FIG. 3, for the purpose of convenience, where a signal is defined by the relative voltage between two lines, both lines are shown. Where a signal is defined absolutely with respect to a common reference point, described as ground voltage, only one line is shown. In such latter case, it us assumed that such a suitable common reference point is provided in device 22 although it is not shown. The signal entering device 22 from modem line 26 is a relative signal and is thus defined between two wires 26a and 26b. Similarly, the signal in a telephone line 20 is also a a relative signal and is therefore defined between two lines 20a and 20b. As will be discussed below, other lines may also carry relative signals.

Modems 16 and 18 are conventional devices well known in the communications arts. Accordingly, no detailed description of the construction or operation of modems 16 or 18 is included herein. All operating characteristics ascribed to the modems 16 and 18 are operating characteristics well known and understood in the art.

One line 20a of telephone line 20 connects to disconnect relay means 30. Disconnect relay means also receives lines 26a and 26b of line 26 from modem 16. Disconnect relay means 30 also receives disconnect relay energizer line 34, further described below. Disconnect relay means 30 is connected to output line 32. Disconnect relay means 30 is operable to establish a modem connection between modem line 26a and telephone line 20a and between modem line 26b and output line 32.

Disconnect relay means 30 is operable, upon receipt of a disconnect energize signal from disconnect energize line 34, to break such modem connections and to establish a high resistance connection between telephone line 20a and output line 32.

Output line 32 passes through a line-in-use detector means 36. Any signal in line 32 passes essentially unaltered through in-use detector means 36. In-use detector means 36 is operable to detect a direct current flowing in output line 32. In-use detector means 36 is operable, having determined the presence of such a direct current in output line 32, to deliver an in-use signal to in-use line 40.

Output line 32 in turn connects to an analog interface means 42. Analog interface means 42 is also connected to signal line 46 and interface line 44. Analog interface means 42 is operable to allow direct current to pass essentially unhindered from output line 32 to interface line 44. Analog interface means 42 also operates to allow alternating current carrier signal in line 46 to pass essentially unhindered to interface line 44. In effect an AC carrier signal in line 46 may be added to a DC signal in line 32 to form a combination signal in interface line 44. Finally, analog interface means 42 is also operable to deliver an AC signal to signal line 46 corresponding to an AC component of a combination signal received in interface line 44.

Interface line 44 in turn is connected to termination relay switch means 48, which in turn is connected to telephone line 20b. Relay switch means 48 is operable to maintain and establish an electrical connection between interface line 44 and telephone line 20b. Termination relay switch means 48 is also operable to break such connection when it is desired to terminate such communication.

The signal line 46 connects analog interface means 42 with gain control means 52. Gain control means 52 is operable to transform the signal in signal line 46, which may be an alternating signal of variable amplitude to a signal having a more or less constant amplitude or amplitudes varying about a more or less constant mean amplitude. Such adjusted amplitude signal is passed to signal input line 54.

Signal input line 54 in turn is connected to request signal detector means 56 and password transmit signal detector means 58, the detector means 56 and 58 being connected in parallel.

Each of request signal detector means 56 and transmit signal detector means 58 is operable to determine the presence or non-presence of a signal of pre-determined characteristics in signal input line 54. For example, such characteristics could be selected to be amplitude, frequency, phase shift or waveform shape. Each detector means 56 and 58 is operable to detect a different signal having different pre-determined signal characteristics. Upon positively identifying the specific characteristic or characteristics, each detector means 56 or 58 is operable to deliver a corresponding detection signal to respective detector lines 60 and 62.

In-use line 40, detector output line 60 and detector output line 62 each are delivered to an input/output buffering means 64. Input/output buffering means 64 is also connected to a switch line 108, which is electrically connected to mode select switch means 106. Switch means 106 is operable whereby an access security device 22 or 24 may be selected to be in a transmitting or in a receiving mode. Switch means 106 is also operable whereby to deliver to switch line 108 an appropriate digital signal identifying the particular mode in which it is desired to operate the access security device 22 or 24.

Input/output buffering means 64 in turn is connected to a micro-processor bus means 66. Bus means 66 in turn connects to a micro-processor means 68. Micro-processor means 68 is a conventional micro-processor as is well known and understood in the electronic arts. The bus means 66 also connects a random access memory means 70, timer means 72, and program/password storage means 74, in parallel with each other and with input/output buffering means 64.

The micro-processor means 68 is operable to be programmed by software whereby the processor means 68 can examine the contents of the input/output buffering means 64, compare such content to various passwords stored in the program/password storage means 74, and deliver appropriate signals to the input/output buffering means 64 to direct further action by access security device 22, as described below. The micro-processor means 68 is also operable to use a timer means 72 in order to determine the date and time at which a comparison takes place and to time the period of communication between security access devices 22 and 24. The micro-processor means 68 has a limited internal memory, therefore processor means 68 is operable to use external random access memory means 70 as required by the micro-processor means 68.

Input/output buffering means 64 is connected to switch output lines 78 and 80, disconnect relay line 34, status lines 83, 84, 85 and 86, and relay switch line 87. Input/output buffering means 64 is operable to receive and deliver all inputs to the micro-processor means 64. As well buffering means 64 is operable to receive all outputs from the micro-processor means 64 and to deliver same to other parts of access security device 22.

Switch output lines 78 and 80 connect to analog modulator switch means 88. Analog modulator switch means 88 receives a request signal line 90 and a transmit signal line 92.

In turn, request signal line 90 connects to a request signal generator means 94. Request signal generator means 94 is operable to continuously generate and deliver to request signal line 90 an electrical signal having pre-determined characteristics. Such characteristics may, for example, be amplitude, frequency, phase shift, and waveform shape.

Similarly, transmit signal line 92 is connected to transmit signal generator means 96. Transmit signal generator means 96 is operable to continuously generate and deliver to transmit signal line 92 a signal with predetermined characteristics such as amplitude, frequency, phase shift, and waveform shape, which characteristics are different from those of the request signal.

Analog modulator/switch means 88 is operable either to pass a signal from line 90, to pass no signal, or to modulate a signal from line 92. Accordingly analog modulator/switch means 88 is operable to move to one of three positions—a request position, an off position and a transmit position, respectively. Binary signals present in switch output lines 78 and 80 control the position of and modulation by analog modulator/switch means 88.

In other words, for example, if a signal is present in switch output line 78 and not in switch output line 80, analog modulator/switch means 88 may be in the request position (i.e. operable to pass a request signal). If no signal is present in either output line 78 or 80, the analog modulator/switch means 88 may be in the off position (i.e. no signal passes). If a signal is present in switch output line 80, the analog/modulator switch means may be in the transmit position (i.e. operable to pass a transmit signal). Finally, if a signal is present in both switch output lines 78 and 80, the transmit signal may be modulated according to a pre-determined method. For example, the waveform, amplitude, frequency or phase could be altered. A series of binary signals arriving sequentially at line 78 would be operable to modulate the transmit signal in corresponding fashion.

Delivery line 98 in turn connects to matching circuit means 50. Matching circuit means 50 is operable primarily to match the impedance of the analog switch 88, request signal generator 94 and transmit signal generator 96 circuitry to the impedance of the analog interface means 42 and the circuitry leading to telephone line 20. Matching circuit means 50 may also be operable to adjust the amplitude of the signal in delivery line 98 if it is necessary to so adjust the amplitude of such signal to match the amplitudes of signals which are commonly carried in telephone line 20. The output of matching circuit means 50 is delivered to a line 100. Line 100 carries the analog signal having the predetermined characteristics and the corrected amplitude. Line 100 connects to line 46. In particular, line 100 is comprised of two individual wires 100a and 100b, defining the signal therebetween. Line 100a connects to line 46a. Line 100b connects to line 46b.

It will be appreciated that if a selected signal characteristic of the request or the transmit signal is amplitude, gain control means 52 is operable to adjust the amplitude of the signal in line 46 to a mean level, suitable for detection by request signal detector means 56 or transmit signal detector means 58. The amplitude variations of the signal take place about such mean level.

Similarly, matching circuit means 50 in such a case may be operable to adjust the amplitude so that the amplitude varies about a mean level, suitable for transmission through telephone line 20.

The micro-processor means 68 is also operable, in conjunction with timer means 72, to determine whether or not a password has been matched within a pre-determined amount of time. If a match is not established within such a pre-determined time, micro-processor means 68 is operable to deliver a suitable signal to input/output buffering means 64. In turn, input/output buffering means 64 is operable to deliver a signal to relay switch line 87. Relay switch line 87 connects to relay switch means 48.

Similarly, a signal may be delivered by the micro-processor means 68 to the input/output buffering means 64, which in turn may deliver a signal to disconnect relay line 34.

The micro-processor means 64 is also operable to deliver status signals to lines 83, 84, 85 and 86, through input/output buffering means 64. Lines 84 and 86 in turn connect to status lights 102 on a front panel 104 of housing 27. Such status lights 102 may indicate, for example, whether or not security access device 22 is in a receive or in a transmit mode, whether or not communication between computers 12 and 14 is occurring, whether or not an unsuccessful attempt to gain access to the computer 14 has been made, and whether the device is in use.

It will be appreciated that each of the above-described components of access security device 22 or 24 are themselves well known devices which may be designed from well known electronic parts by persons familiar with the electronic arts.

In operation, it is desired to transmit data from computer 12 to computer 14 across telephone line 20. Mode select switch means 106 on the transmitting access security device 22 is set to the transmit position. The switch means 106 of the other access security device 24 is set to receive. Accordingly, modem 16 dials the telephone number corresponding to the location of computer 14. Modem 16 is connected through security access device 22 to telephone line 20. In practise, telephone line 20 is not simply merely a wire leading from computer 12 to computer 14 but in fact is the entire telephone exchange network. Modem 16, although it dials a number corresponding to the location of computer 14, in fact delivers a signal to a central telephone exchange (not shown). The telephone exchange supplies a constant voltage (for example, 48 V is standard in the United States) across telephone lines 20a and 20b to both modems 16 and modem 18. When such line is not in use, no current flows in either telephone line 20a or 20b. As modem 16 commences dialing, modem 16 establishes a high resistance connection between lines 26a and 26b. A signal, corresponding to the telephone number dialed, passes directly through disconnect relay means 30 to telephone line 20a and output line 32. A signal in line 32 passes through line-in-use detector means 36, analog interface means 42, to interface line 44 and through relay switch means 48 to telephone line 20b. Security access device 22 is transparent to a telephone dialing signal emanating from its associated modem 16. Thus, in effect, modem 16 is able to dial the computer 14 without interfering with or interference from security access device 22.

The central telephone exchange (not shown) receives the telephone number signal and delivers high voltage impulses on line 20 to the desired telephone number location. Such high voltage impulses pass directly through access security device 24. In particular, the high voltage impulse signals pass directly through relay switch means 48, analog interface means 42 and line-in-use detector means 36 and disconnect relay means 32 to modem 16. No direct current is flowing in the telephone line 20 to access security device 24. The high voltage impulses arriving at modem 18 cause modem 18 to be aware that a communication is being attempted. In other words, the telephone at modem 18 commences ringing. Modem 18 answers the ringing telephone. Answering is achieved by making a high resistance connection between lines 26a and 26b. Such as a high resistance connection thereby allows a small direct current to flow from telephone line 20a through disconnect relay means 30, to modem line 26a, to modem line 26b back through disconnect relay means 30 and to output line 32. Such current typically is of the magnitude of about 25 milliamps.

Line-in-use detector means 36 detects the presence of the small direct current in line 32. Detector means 36 then delivers a line-in-use signal to in-use line 40. In other words, a signal passes through line 40 to input-/output buffering means 64 and thence to micro-processor means 68 that modem 18 has answered the telephone.

Upon receipt of such information that the telephone has been answered, micro-processor means 68 operates to deliver a signal to input/output buffering means 64 and thence to disconnect relay line 34 and disconnect relay means 30.

Disconnect relay means 30 operates to break the connection between modem 18 and telephone line 20. In particular, switches (not shown) are opened to disconnect modem line 26a from telephone line 20a and modem line 26b from input line 32. Furthermore, an additional switch (not shown) is closed to establish a high resistance connection between telephone line 20a and output line 32, thereby continuing to allow the direct current of about 25 milliamps to flow in telephone line 20.

Simultaneously, micro-processor means 68 delivers additional signals to input/output buffering means 64 and thence to switch output lines 78 and 80 and analog modulator/switch means 88. Such signals in switch output lines 78 and 80 operate to place analog modulator/switch means in a position whereby analog modulator/switch means 88 connects request signal line 90 to delivery line 98. Request signal generator 94 and password transmit signal generator 96 operate essentially continuously. Upon connection of line 90 to line 98, the request signal is allowed to pass through analog modulator/switch means 88 to matching circuit 50.

In matching circuit means 50 the request signal is adjusted and then passed to line 100 and to signal line 46.

Signal line 46 delivers the request signal to analog interface means 42.

Analog interface means 42 superposes the request signal onto the direct current signal in output line 32. The super-posed combination signal is passed by analog interface means 42 to interface line 44. Relay switch means 48 is in the closed position, therefore the combination signal containing the request signal is passed to telephone line 20b. The request signal thus passes down telephone line 20 to access security device 22.

The combination signal passes through relay switch means 48 of access signal device 22 to analog interface means 42. Analog interface means 42 operates to duplicate the request signal component of the combined signal and passes the request signal to line 46. The request signal sent by access device 24 thus passes to gain control means 52.

Gain control means 52 operates to adjust the amplitude of the request signal in line 46. The amplitude-adjusted request signal then passes to signal input line 54 and travels to both request signal detector means 56 and transmit signal detector means 58.

Request signal detector means 56 has been preset to be able to detect the request signals which may be generated by other authorized access security devices such as device 24, in a communications link 10. Having detected the presence of the request signal, request signal detector 56 delivers a detection signal to detector output line 60.

Meanwhile, password transmit signal detector means 58 does not detect an appropriate signal. The only signal which has been inputted to transmit signal detector means 58 is the request signal, which is different from the password transmit signal. Therefore no detection signal is passed to detector output line 62.

The detection signal from detector output line 60 is delivered to input/output buffering means 64 and thus micro-processor means 68 becomes aware of the fact that a request signal has been received by access security device 22. Accordingly, micro-processor means 68 acts to deliver a signal to input/output buffering means 64 and thence to disconnect relay line 34 and disconnect relay means 30.

Disconnect relay means 30 then operates to break the connection to modem 16, in the same manner in which access security device 24 broke the connection to its associated modem 18, and to establish a high resistance connection between telephone line 20a and output line 32.

Simultaneously, micro-processor means 68 delivers signals to input/output buffering means 64 and thence to switch output lines 78 and 80 and to analog modulator/switch means 88. In this instance, micro-processor means 68 will deliver appropriate signals to either modulate or not modulate the transmit signal at analog modulator/switch means 88. The length of time in which analog switch means 88 remains in a modulate or not modulate configuration depends upon various passwords stored in the program/password storage means 74. In other words, micro-processor means 68 operates to deliver a series of signals to analog modulator/switch means 88 corresponding to a specific password.

The analog/modulator switch means 88 is controlled by the micro-processor means 68 to move to the password transmit position and to either modulate or not moduate the transmit signal. Each time the analog modulator/switch means 88 is in the modulate configuration the transmit signal generated by the transmit signal generator means 96 is modulated and allowed to pass through analog modulator/switch means 88 to delivery line 98. Each time analog modulator/switch means 88 is in the not-modulate configuration, an unmodulated transmit signal is passed therethrough. Thus the signal in delivery line 98 comprises a password transmit signal carrying a train of bursts of the modulated characteristic. The bursts will be spaced apart in time according to the particular password being transmitted.

For example, amplitude may be modulated between a zero amplitude and a maximum amplitude. Accordingly, analog modulator/switch means 88 is operable to either allow the transmit signal to pass or to not pass. In such case the signal in delivery line 98 comprises a train of bursts of the transmit signal.

The signal in delivery line 98 passes through matching circuit 50, which may operate to adjust the amplitude of the password signal. The password signal is delivered to line 46 to analog interface means 42. Analog interface means 42 superposes the password signal on the DC signal in line 32 and delivers the combined password signal to interface line 44. The password signal is then free to pass through relay switch means 48 to telephone line 20b.

Thus, the password signal passes down telephone line 20 to access security device 24.

To summarize the operation to this point, modem 16 has telephoned modem 18. Modem 18 has answered the telephone. The process of answering the telephone by modem 18 causes access security device 24 to commence operation. Access security device 24 requests a password signal from access security device 22. Access security device 22 notes the request and delivers a password signal to access security device 24. Access security deivce 24 must now compare the suitability of the password to various passwords stored in it.

The password signal from access security device 22 passes through relay switch means 48 to analog interface means 42 of access security device 24. Analog interface means 42 extracts the password signal from the combined signal which it receives. The password signal is passed via line 46 to gain control means 52 where the amplitude may be adjusted and thence to signal input line 54. The password signal then passes to both request signal detector means 56 and transmit signal detector means 58.

Only password transmit signal detector means 58 in this instance detects the presence of the modulated transmit signal. Accordingly, a detection signal is delivered to detector output line 62 and thence passes to input/output buffering means 64.

Because the password signal arrived at access security device 24 as a train of modulated transmit signals, password transmit signal detector means 58 will deliver a train of detection signals to the input/output buffering means 64.

The micro-processor means 68 observes such train of detection signals. The train of detection signals corresponds to the password sent by access security device 22. Accordingly, micro-processor means 68 compares the delivered password to passwords stored in the program/password storage means 74. Upon receipt of a first signal from access security device 22, timer means 72 commences timing.

If a match between the passwords is established, micro-processor means 68 removes the signal to input/output buffering means 64 to disconnect relay line 34. Upon removal of the signal in disconnect relay line 34, disconnect relay means 30 operates to reestablish a connection betwen line 26 and telephone line 20. In other words, modem 18 is now enabled to communicate with modem 16. Furthermore, the signals from micro-processor means 68 to input/output buffering means 64 to analog modulator/switch means 88 are also interrupted, thereby allowing analog modulator/switch means 88 to return to the off position. In this fashion, the request signal is no longer delivered to the telephone line 20.

If micro-processor means 68 is unable to establish a match between the delivered password and a password in its program/password storage means 74, micro-processor means 68 continues to deliver signals to input/output buffering means 64 and analog modulator/switch means 88 to allow the request signal to be continuously delivered to telephone line 20.

Meanwhile, access security device 22 having delivered a first attempt at a password then continues to monitor whether or not access security device 22 is continuing to receive a request signal from access security device 24. If micro-processor means 68 of device 22 determines that it is continuing to receive a request signal, micro-processor means 68 operates to deliver an additional train of modulated transmit signal, corresponding to the password in a second attempt to establish communication with modem 18.

If access security device 24 is unable to match the second delivered password, the process will repeat. This process of delivering and attempting to matching a password would continue indefinitely. However, the micro-processor means 68 of device 24 is programmed to terminate communication upon the expiry of a predetermined amount of time. Thus, if no positive password match is established within the pre-determined amount of time, micro-processor means 68 will deliver a signal to input/output buffering means 64 and to relay switch line 87. Such signal then passes to relay switch means 48 and relay switch means 48 opens to a break communication between telephone line 20b and access security device 24. The breaking of this connection interrupts the direct current flow through telephone line 20 and is detected by and indicates to the central telephone exchange that the telephone line to computer 14 is no longer in use. The central telephone exchange will then disconnect the connection between modem 16 and computer 14. After a pre-determined amount of time, relay switch means 48, disconnect means 30 re-establishes connection between modem 18 and telephone line 20 and access security device 24 resets.

In this fashion, if no password is positively received from the telephone caller, the unknown telephone caller is unable to gain access through access security device 24 to computer 14.

If a positive password identification is made, the micro-processor means 68 of access security device 24 removes the disconnect signal from disconnect energize line 34. Disconnect relay means 30 breaks the high resistance connection between lines 20a and 32 and re-establishes the connections between lines 26a and 20a and between lines 26b and 32. Furthermore, microprocessor means 68 operates to halt the delivery of the request signal.

The request signal detector means 56 of access security device 22 no longer detects a request signal from device 24. Accordingly, the micro-processor means 68 of device 22 operates to remove the disconnect signal from disconnect energize line 34. Disconnect relay means 30 breaks the high resistance connection between lines 20a and 32 and re-establishes the connections between lines 26a and 20a and between lines 26b and 32.

Accordingly modems 16 and 18 are now free to communicate with each other. Modems 16 and 18 communicate by delivering their respective carrier signals to each other. Once the modem 16 and 18 themselves have identified a positive communication link therebetween, access from computer 12 to computer 14 is then enabled.

For additional security, computers 12 and 14 may allow or require manual passwords to be exchanged before commencing further communication. Communication between computer 12 and computer 14 proceeds as long as is necessary.

When the communication is terminated one or the other of the parties will hang up. That is, one or other of the modems 16 or 18 will break the high resistance connection between line 26a and 26b. Such hanging up operation causes the respective access security device 22 or 24 to reset. The line-in-use detector means 36 in the security access device 22 or 24 as the case may be, no longer sees the direct current flowing therethrough, and the appropriate reset signals to input/output buffering means 64 are delivered by micro-processor means 68.

The other modem 16 or 18, i.e. the one that did not hang up, observes the loss of the carrier signal from the other modem 16 or 18. Once such loss has been determined to have occurred, such other modem 16 or 18, as the case may be, then also hangs up. The access security device at the location of such other modem 16 or 18 then also resets.

In an alternate embodiment, any of the information noted by the micro-processor means 68 may be outputted to a suitable output device, such as a printer (not shown). In this way, it is possible to provide a record of transactions that have occured. In particular, it is possible to note the date and time of any attempted communication to the computer.

In a further embodiment an access security device may be combined with a modem. The modems 16 or 18, which are stand-alone devices, in fact incorporate micro-processor means of their own. Similarly, they also incorporate signal generator means to generate their necessary carrier signals. Accordingly, it would be possible to combine the functions of a modem and an access security device according to the invention.

In further embodiments, it will be appreciated that mode selected switch means 106 may be manually operable between receive and transmit positions. Alternatively, switch means 106 may be automatically returnable to receive position upon completion of a transmission in the transmit mode. In operation, such a switch means 106 is generally in the receive position, unless it is desired to effect a transmission. In order to allow a transmission to commence, the switch means 106 is manually moved to the transmit position. Upon release of the switch means 106, it will automatically return to the receive position. A delay means (not shown) may be included in switch line 108, operable whereby to deliver a transmit signal to input/output buffering means 64 during the transmission by computer 12. Upon completion of the transmission, the delay means would be operable to receive a signal from input/output buffering means 64 that the modem 16 associated with computer 12 has hung up, that is terminated the transmission. Upon receipt of such signal, the delay means would be operable to allow a receive signal to pass from switch means 106 to input/output buffering means 64, thereby putting access security device 22 in the receive mode. Such a switch means provides the advantage that the computer and modem is always enabled to receive a transmission, unless it is desired to transmit.

In a further embodiment, an access security device according to the invention may be provided with access logging capability. Such capability would allow the recording of all communication attempts, both successful and unsuccessful, with the computer in question. Such recording can be provided locally or at a remote location. More particularly, the central telephone exchanges or a police station (provided with suitable alarms and telephone call tracing equipment) can be warned of all unsuccessful attempts at communication with the computer.

In such an embodiment, micro-processor means 68 is operable to deliver a signal to the input/output buffering means 64, corresponding to the time (and other relevant information) that a communication attempt has been commenced. Input/output buffering means 64 is operable to deliver such signal to an output device, such as a printer, video display terminal, alarm or the like.

It will be appreciated that an access security device according to the invention is programmed with the appropriate password or passwords and controlling software. It is also possible to provide an algorithmic program whereby the password and the password codes may be randomly (or otherwise) changed from time to time. Such algorithmic programming may render it very difficult, and practically impossible, for an unauthorized user to gain entry to the restricted access computer. Furthermore, it may be possible from time to time to alter the signal generated by request signal generator means 94 and transmit signal generator means 96, or to alter the method of modulation of analog modulator/switch means 88. By such method, non-standard signals and codes may be used and changed from time to time, thus rendering decoding virtually impossible.

It will be appreciated, of course, that in order to allow authorized user access to their own system, each access security device in a link up or a network of computers must be provided with suitable programming whereby such devices are able to generate and decode the appropriate passwords.

In other embodiments, it will be appreciated that relay switch means 48 and in-use detector means 36 may be located in different positions, apparent to any person skilled in the art, to perform the same functions.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A method for restricting access to a first telephone device, at a first location, from a second telephone device at a second location across a telephone system comprising the steps of:
    interposing a first security unit between said first telephone device and said system, and interposing a second security unit between said second telephone device and said system;
    at said first unit, detecting that said first device has received an analogue telephone call from said second telephone device at said second location;
    temporarily interrupting said telephone call between said first device and said telephone system, and more or less simultaneously, establishing a connection between said first unit and said telephone system, whereby to said telephone system said first unit appears to continue to have answered said telephone call;
    in said first unit automatically generating a request signal and delivering same to said second unit across said telephone system, said request signal requiring a digital modulated analogue-carrier password signal to be delivered from said second unit;
    in said second unit generating a digital password transmit signal;
    modulating said digital password transmit signal onto an analogue carrier signal and delivering same to said first unit;
    in said first unit, upon receipt of a password transmit signal from said second unit, automatically converting said password transmit signal to a digital password signal and determining whether said digital password transmit signal corresponds to a predetermined password, and,
    automatically re-connected said first telephone device and said telephone system, upon detecting correspondence between said password transmit signal and said password.

2. A method as claimed in including the step of:
    upon the failure to determine that a correspondence between the said password transmit signal and the said password exists, automatically breaking a connection to the telephone system at the said first location, whereby to the telephone system the answering unit appears to have terminated the telephone call.

3. A method as claimed in claim 2 including the additional steps of:
    commencing the operation of a timer upon receipt of a first password transmit signal, and,
    upon the expiry of a predetermined amount of time as measured by the timer, breaking said communications to the telephone system at said first location.

4. A method as claimed in claim 1 including the additional steps of:
    at the second location, automatically detecting a request signal received from the first location across the telephone system, and,
    automatically delivering said password transmit signal corresponding to the said predetermined password to the first location across the telephone system.

5. A method as claimed in claim 3 including the additional steps of:
    at the first location prior to the expiry of the said amount of time, continuing to deliver a request signal to the second location across the telephone system.

6. A method as claimed in claim 4 including the additional steps of:
    at the first location, continuing to deliver the said request signal to the second location across the telephone system;
    at the second location, continuing to detect the said request signal from the first location, and,
    at the second location, continuing to deliver the said password transmit signal to the first location across the telephone system.

7. A method as claimed in claim 1 wherein said first telephone device is connected with a modem means and wherein said modem means is connected with a computer.

8. An access security apparatus for use in association with a telephone system, and a telephoning device and an answering device, said answering device being operable to answer a telephone call from said telephoning device said access security apparatus comprising;
    a receiving security unit connectable between said answering device and said telephone system;
    disconnect relay means operable to temporarily interrupt said telephone call between said answering device and said telephone system, and more or less simultaneously, to establish a connection between said receiving security unit and said telephone system;
    request signal generating means in said receiving unit being operable in response to a telephone call from said telephoning device to automatically generate a request signal requiring a coded response;
    a transmitting security unit connectable between said telephoning device and said telephone system;
    password transmit signal generating means in said transmitting unit being responsive to said request signal from said receiving unit and operable to automatically generated a digital password transmit signal, said digital password transmit signal being modulated onto an analogue carrier signal and deliver same to said receiving security unit, and,
    a circuit means in said receiving security unit, said switch circuit means being responsive to said password transmit signal to automatically operate said disconnect relay to reestablish connection between said telephoning device and said answering device across said telephone system.

9. An access security apparatus as claimed in claim 8 wherein the receiving unit comprises:
   a line-in-use detector means connectable to the telephone system and to the answering unit operable to detect that the answering unit has answered a telephone call and to deliver an answer signal,
   said request signal generating means being connected to said line-in-use detector means, and being responsive to said answer signal and operable to automatically generate said request signal.

10. An access security apparatus as claimed in claim 9 wherein the transmitting unit comprises:
    a request signal detector means connectable to the telephone system operable to detect the request signal and to deliver a request detect signal, and,
    said password generating means being connected to the request signal detector means and connectable to the telephone system, and being responsive to the request detect signal to automatically generate said password transmit signal.

11. An access security apparatus as claimed in claim 10 wherein the switch circuit means comprises;
    a comparator means connectable to the telephone system operable to receive and automatically compare said password transmit signal to a predetermined password code and, upon establishing a match between said password transmit signal and the password code, to automatically establish the said communication connection between the telephoning unit and the answering unit for communication across the telephone system.

12. An access security apparatus as claimed in claim 11 wherein the line-in-use detector means is operable to detect the presence of a direct current flowing between the receiving unit and the telephone system.

13. An access security apparatus as claimed in claim 12 wherein the receiving unit and the transmitting unit are essentially identical and wherein each unit comprises;
    a said line-in-use detector means connectable to the telphone system;
    a said request signal generating means connected to the line-in-use detetor means;
    a said request signal detector means connectable to the telephone system;
    a said password transmit signal generating means connected to the request signal detector means and connectable to the telephone system;
    a said comparator means connectable to the telephone system, and,
    a mode controller means connected to the password transmit signal generating means and the request signal generating means, the mode controller means including a mode selection switch means, the mode controller means being responsive to the position of the mode select switch means to control the operation of said receiving unit and transmitting unit in a mode pre-selected from one of a transmit mode and a receive mode.

14. An access security apparatus as claimed in claim 13 wherein the transmitting unit is in a transmit mode and the receiving unit is in a receive mode.

15. An access security device for use at a first location in association with a telephone system and a telephone answering device said answering device being operable to answer a telephone call from a telephoning device at a second location, said access security device comprising:
    a processor means;
    a disconnect relay means connectable between said telephone answering device and said telephone system and connected to said processor means and operable to disconnect said answering device from said system;
    a line-in-use detector means connectable between said disconnect relay means and said telephone system and connected to said processor means, said line-in-use detector means being responsive to the answering of a call by said telephone answering device and being operable to cause said processor means to deliver a disconnect signal to said disconnect relay means and simultaneously to automatically deliver switch position signals;
    said disconnect relay means being operable to receive said disconnect signal from said processor means, whereby to disconnect said telephone answering device from said telephone system and to, more or less simultaneously, establish an alternate connection across said telephone system to allow a direct current to flow therethrough;
    an analog modulator switch means connected to said processor means to receive said switch position signals and to switch between a request position, an off position and a transmit position, according to said switch position signals;
    a request signal generator means connected to receive said request position signal of said analog modulator switch means and operable to generate a request signal;
    a password transmit signal generator means connected to receive said transmit position signal of said analog modulator switch means and operable to generate an analogue transmit carrier signal;
    said analog modulator switch means being operable to pass said request signal in one mode, and to modulate a digital password transmit signal onto said analogue transmit carrier signal in another mode;
    an analog interface means connected between said disconnect relay means and said telephone system and connected to receive a signal from said analog modulator switch means, said analog interface means being operable to deliver a signal from said analog modulator switch means to said telephone system;
    termination relay switch means connected between said disconnect relay means and said telephone system, said termination relay switch means being further connected to said processor means;
    said analog interface means also being operable to receive a request signal from said telephone system and to generate a corresponding request signal, and being further operable to receive a password transmit signal from said telephone system and to generate a corresponding password transmit signal;
    a request signal detector means connected to said analog interface means to receive said request signal from said analog interface means and operable to compare said request signal to a predetermined signal, and, upon establishing a correspondence therebetween to deliver a detect request signal;

a password transmit signal detector means connected to said analog interface means to receive said password transmit signal, and being operable to deliver a detect password transmit signal;

said processor means also being connected to said request signal detector means and to said transmit signal detector means to receive said detect request signal and said password transmit signal detector, respectively;

said processor means also being operable, upon receipt of said detect request signal to automatically deliver switch position signals to said analog modulator switch means according to a pre-determined password;

said processor means also being operable, upon receipt of a detect password transmit signal, to compare said detect password transmit signal to a pre-determined password to determine whether said detect password transmit signal corresponds to said password;

said processor means also being operable, upon determining the existence of a correspondence between said detect password transmit signal and said password, to terminate delivery of a signal to said disconnect relay means, whereby to reestablish said connection between said telephone answering device and said telephone system and to break said alternate connection across said telephone system;

said processor means also being operable, upon failing to determine the existence of a correspondence between said detect password transmit signal and said password, to deliver a terminate signal to said termination relay switch means, and, said termination relay switch means being operable, upon receipt of said terminate signal, to break a connection between said disconnect relay means and said telephone system; and, a mode selection switch means connected to said processor means, said mode selection switch means being operable to deliver a transmit mode signal or a receive mode signal to said processor means.

16. An access security device as claimed in claim 15 wherein said processor means comprises a microprocessor means.

17. An access security device as claimed in claim 16 wherein the micro-processor means is connected to a timer means, the timer means being operable to commence timing upon receipt by the micro-processor means of said detect request signal, and the micro-processor means being operable to delay delivery of the terminate signal until the timer means indicates that a pre-determined amount of time has passed without the micro-processor means having been able to establish a correspondence between the detect password transmit signal and the password.

18. An access security device as claimed in claim 17 wherein an input/output buffering means is interposed between the micro-processor means and all other said means, except the timer means, whereby all signals delivered to and from the micro-processor means pass through the input/output buffering means.

19. An access security device as claimed in claim 18 wherein a gain control means is interposed between the analog interface means and the request signal detector means and said password transmit signal detector means, the gain control means being operable to adjust the amplitude of a signal received from the analog interface means.

20. An access security device as claimed in claim 19 wherein a matching circuit means is interposed between the analog modulator switch means and the analog interface means, whereby the matching circuit means may be operable to adjust the amplitude of a signal received from the analog modulator switch means and to adjust the impedance of the analog modulator switch means said request signal generator means and said password transmit signal generator means as seen by the analog interface means.

21. An access security device as claimed in claim 20 and wherein said micro-processor means is connectable to an output device means and wherein said microprocessor means is operable to generate a time signal corresponding to the time of a communication attempt and to deliver said time signal to said output device means.

22. An access security device as claimed in claim 21 wherein said micro-processor means is operable to generate status signals and wherein said output device means includes status lights operable to be illuminated according to said status signals received from said micro-processor means.

23. An access security device as claimed in claim 22 including program/password storage means and random access memory means in parallel with the timer means, both connected to the micro-processor means.

* * * * *